United States Patent [19]

Schleifstein

[11] Patent Number: 4,804,698

[45] Date of Patent: Feb. 14, 1989

[54] FLAME RETARDANT POLYPROPYLENE BASED FORMULATIONS

[75] Inventor: Robert A. Schleifstein, Baton Rouge, La.

[73] Assignee: Ethyl Corporation, Richmond, Va.

[21] Appl. No.: 177,068

[22] Filed: Apr. 4, 1988

[51] Int. Cl.$^4$ .......................... C08K 5/34; C08K 5/06; C08K 3/16

[52] U.S. Cl. ..................... 524/89; 524/371; 524/412

[58] Field of Search ............ 524/89, 371, 412

[56] References Cited

U.S. PATENT DOCUMENTS

| | | | |
|---|---|---|---|
| 3,730,940 | 5/1973 | Versnel et al. | 260/41 A |
| 3,730,942 | 5/1973 | Green et al. | 260/41 A |
| 3,761,443 | 9/1973 | Newcombe | 260/45.75 B |
| 3,784,509 | 1/1974 | Dotson et al. | 260/45.75 B |
| 3,786,023 | 1/1974 | Dotson et al. | 260/45.75 B |
| 3,794,614 | 2/1974 | Versnel | 260/45.75 B |
| 3,868,388 | 2/1975 | Dotson et al. | 260/326 N |
| 3,917,642 | 11/1975 | Wolford et al. | 260/326 C |
| 3,923,734 | 12/1975 | Dotson et al. | 260/45.75 B |
| 4,010,219 | 3/1977 | Aoyama et al. | |
| 4,388,429 | 6/1983 | Ilardo et al. | |
| 4,430,467 | 2/1984 | Lesniewski et al. | 524/89 |
| 4,530,880 | 7/1985 | Taniuchi et al. | |
| 4,666,947 | 5/1987 | Brichta et al. | |

Primary Examiner—Kriellion Morgan
Attorney, Agent, or Firm—Edgar E. Spielman, Jr.

[57] ABSTRACT

A flame retardant polypropylene based formulation which contains polypropylene and a flame retardant amount of decabromodiphenyl oxide and a halogenated bisimide.

9 Claims, No Drawings

FLAME RETARDANT POLYPROPYLENE BASED FORMULATIONS

BACKGROUND OF THE INVENTION

This invention relates to novel flame retardant polypropylene based formulations. For the purposes of this invention "polypropylene" shall mean the isotactic homopolymer formed from propylene or the block copolymer of such isotactic homopolymer and polyethylene. The block copolymer will generally contain up to 94% homopolypropylene segments. Such homopolymers and block copolymers are well-known to those skilled in the art.

Polypropylene based formulations have proven to be commercially important for use in the production of film, injection and blow molded articles, extruded pipe, wire insulation and fibers. For many of these uses, it is important that the resultant film, articles, pipe, etc. have a flame retardant quality.

Flame retardancy can be obtained by including a flame retardant compound and an inert filler in the formulation. The flame retardant compound is generally a brominated hydrocarbon which can be used alone or with a synergist, such as $Sb_2O_3$. The inert filler can be talc, mica, silica, clay, chalk, etc. so long as the filler is inert to the formulation and not a ready fuel source. While such formulations may be useful, they are not ideal, since, to obtain a UL-94 rating of V-0, the amount of flame retardant and the amount of inert filler used in the formulation is generally high, e.g. about 25 wt. % flame retardant, 10 wt. % $Sb_2O_3$ and about 15 wt. % inert filler, based upon the total weight of the formulation. The high amount of flame retardant adds to the expense of the formulation while the high amount of filler adversely affects some of the physical properties of articles produced from the formulation. For example, the stiffness of the molded article is greatly increased, while its surface gloss is decreased when high amounts of inert filler are present.

There are some brominated hydrocarbon flame retardants which can provide the flame retardant quality needed without either the use of high amounts of flame retardant or inert filler in the formulation, e.g. tetrabromobisphenol-A bis(2,3-dibromopropylether). Such flame retardants, however, are generally expensive.

It is therefore an object of this invention to provide economical flame retardant polypropylene based formulations which do not require high amounts of flame retardant and/or inert filler. It is another object of this invention to provide articles molded from such formulations.

The Invention

The novel flame retardant polypropylene based formulations of this invention comprise polypropylene and a flame retardant amount of decabromodiphenyl oxide and a halogenated bisimide of the formula

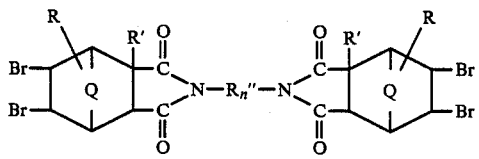

wherein Q is methylene or oxygen, R is hydrogen or an alkyl group containing 1-5 carbons, R' is hydrogen or methyl, n=1 or 0, and R" is an organic group containing 1-15 carbons. The term "polypropylene based" means that the formulation contains at least 40 wt. % polypropylene, as hereinabove defined, based upon the total weight of the formulation.

It has been found, as shown in the examples, that the unique combination of decabromodiphenyl oxide and the above described halogenated bisimides provides a synergistic effect in the formulation of this invention. While the decabromodiphenyl oxide and the halogenated bisimides are well known as individual flame retardants in some thermoplastic formulations, their combined effect in polypropylene based formulations is unique and highly advantageous. The synergism between these two compounds provides excellent flame retardancy without the utilization of a filler in the formulation and with the use of only moderate amounts of these compounds.

The halogenated bisimides of this invention and the processes for their manufacture are described in U.S. Pat. Nos. 3,786,023; 3,917,642; 3,923,734 and U.S. Pat. No. 4,430,467, the teachings of which are incorporated herein by reference. Preferred halogenated bisimides are those in which R and R' are hydrogen, Q is methylene and R" is an alkylene group containing 1-6 carbon atoms. Most highly preferred halogenated bisimides are N,N'-bis(5,6-dibromonorbornane-2,3-dicarboximide) and N,N'-1,2-ethane-bis(5,6-dibromonorbornane-2,3-dicarboximide).

The formulations of this invention can advantageously also include a synergistic amount of a compound such as $Sb_2O_3$, $Bi_2O_3$, $MoO_3$, $ZrO_2$ or mixtures thereof. These compounds are well recognized in the art as enhancing the flame retardant qualities of most brominated flame retardant compounds. Of these enhancing compounds, a most preferred is antimony trioxide in an amount of from about 2 wt. % to about 6 wt. %.

The polypropylene based formulations of this invention will generally contain from about 40 to about 90 wt. % polypropylene. Preferred formulations, due to their good physical qualities, will contain from about 80 to about 82 wt. % polypropylene. The minimum amounts of decabromodiphenyl oxide and halogenated bisimides used in the formulations of this invention to obtain a UL 94 V-0 rating are determined empirically as these amounts are dependent upon the particular polypropylene and the amounts, if any, of the synergistic flame retardant enhancing compound, e.g. $Sb_2O_3$, etc., present in the formulation. The presence of a flame retardant enhancing compound is preferred as a reduction in the needed amounts of decabromodiphenyl oxide and halogenated bisimides is realized. However, due to the density of these flame retardant enhancing compounds, there is an economic limit on their amounts in the formulation from the standpoint of the molder. Generally, a 3 to 5 wt. % loading of these compounds is preferred, with about 4 wt. % being most preferred. In regard to the decabromodiphenyl oxide and halogenated bisimide, a starting point in determining their minimum amounts in a formulation containing a flame retardant enhancing compound is to provide a sufficient amount of each to give a total of from about 8 to about 12 wt. %, with from about 3 to about 5 wt. % being decabromodiphenyl oxide and from about 5 to about 7 wt. % being halogenated bisimide. When the polypropylene is a copolymer, such as Himont Inc.'s Profax®7523, the amount of halogenated bisimide used should be from the upper end of the about 5 to about 7 wt. % range. See Example VIII in which 7 wt. % of Saytex® BN-451 flame retardant was present in a formulation used to produce a plaque having a UL 94 V-0 rating. Amounts of decabromodiphenyl oxide and halogenated bisimide which are larger than the minimum amounts needed can be used, if desired.

The formulations of this invention may be conventionally formed by intimately mixing the ingredients thereof by any suitable means, e.g. by employing an extruder, a two-roll mill or a Banbury mixer.

After the formulation has been formed, it may be utilized in forming molded or extruded articles which have a good flame retardant quality and have good physical properties. Conventional compression molding, injection molding, extruding, etc. devices are suitable for use, the only criticality being that the molding and extruding processes not involve temperatures or other conditions which would adversely affect the formulation.

The formulation of this invention may also contain pigments, plasticizers, antioxidants or other conventional additives. In addition, the formulations of this invention may contain inert fillers. However, the amount of inert filler used should be kept low, say below 3 wt. %, as loadings of only 6 wt. % clay have been found to degrade UL-94 ratings from V-0 to V-2. In essence, the formulations of this invention are substantially filler-free.

The decabromodiphenyl oxide constituent of the formulation is well-known in the art and can be prepared by any of several processes. See for example U.S. Pat. No. 3,763,248 and U.S. Pat. No. 3,965,194.

Examples I-IV are comparative examples and are not of this invention.

EXAMPLE I

This is a base line example in which a formulation containing 100 wt. % polypropylene (Profax® 6423, sold by Himont, Inc.) was compression molded to form a test plaque. The compression molding was performed conventionally using a molding temperature of 175° C. and a molding pressure of 250 psi. The test plaque was submitted to Underwriters Laboratories UL-94 vertical burning test. The material burned.

In Examples II-VII, the formulations were prepared by intimately mixing the indicated constituents in a Brabender mixer.

EXAMPLE II

A test plaque was made from a formulation containing 10.4 wt. % of Ethyl Corporation's Saytex® 102 flame retardant (decabromodiphenyl oxide), 4 wt. % antimony trioxide and 85.6 wt. % Profax® 7523. The same procedures used in Example I were used in molding and testing the plaque. A UL-94 rating of V-2 was obtained.

EXAMPLE III

A test plaque was molded and tested in accordance with Example I. For this example, the formulation from which the test plaque was made contained 22 wt. % Saytex® 102, 6 wt. % antimony trioxide, 14 wt. % talc and 58 wt. % Profax® 6423. The UL 94 rating for this plaque was V-0.

EXAMPLE IV

A test plaque was molded and tested in accordance with Example I. The formulation used contained 10 wt. % of Ethyl Corporation's Saytex® BN-451 flame retardant (N,N'-1,2-.ethane-bis(5,6-dibromonorbornane-2,3-dicarboximide)), 4 wt. % antimony trioxide and 86 wt. % Profax® 6423. A UL 94 rating of V-2 was obtained.

The following examples are illustrative of this invention.

EXAMPLE V

A test plaque was made from a formulation containing 4 wt. % Saytex® 102, 6 wt. % Saytex® BN-451, 4 wt. % antimony trioxide and 86 wt. % Profax® 6423. No inert filler was used. The molding and testing procedures of Example I were used, respectively, to form and test the plaque. A UL 94 rating of V-0 was obtained.

EXAMPLE VI

A formulation containing 4 wt. % Saytex® 102, 5 wt. % Saytex® BN-451, 4 wt. % antimony trioxide and 87 wt. % Profax® 6423 was used in forming a test plaque. The procedures used to form and test the plaque were the same as in Example I. A UL 94 rating of V-0 was obtained.

EXAMPLE VII

A test plaque was made from a formulation containing 3 wt. % Saytex® 102, 7 wt. % Saytex® BN-451, 4 wt. % antimony trioxide and 86 wt. % Profax® 7523. No inert filler was used. The plaque was formed by compression molding using the procedure described in Example I. The plaque had a UL 94 rating of V-0.

As can be seen from Examples V-VII, a UL 94 rating of V-0 can be obtained for polypropylene based formulations without the necessity of using a large amount of flame retardant material and an inert filler. On a wt. % basis, the formulations of this invention use less total decabromodiphenyl oxide and halogenated bisimide to obtain a V-0 rating than is the case when either of these two compounds are used singularly with a filler to obtain the same V-0 rating.

EXAMPLE IX

Test plaques formed from the formulations of Examples I, VI and VII were subjected to the following tests.

TABLE I

| Test | Plaques From The Formulations Of | |
|---|---|---|
|  | Example III | Example VIII |
| Flexural Modulus psi, ASTM D-790 | 411,480 psi | 226,720 psi |
| Heat Deflection, 264 psi, ASTM D-648 | 91.25° C. | 70.6° C. |
| Gloss, observed | dull | glossy |

As can be seen, obtainment of good flame retardancy does not unduly affect the physical properties measured.

What is claimed:

1. A flame retardant polypropylene based formulation comprising:
   (a) polypropylene; and
   (b) a flame retardant amount of,
      (i) decabromodiphenyl oxide, and (ii) a halogenated bisimide represented by the formula:

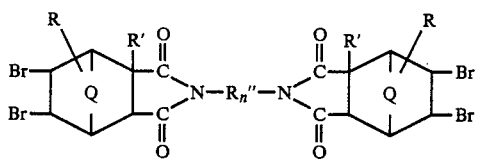

wherein Q is methylene or oxygen, R is hydrogen or an alkyl group containing 1-5 carbons, R' is hydrogen or methyl, n=1 or 0, and R" is an organic group containing 1-15 carbons.

2. The formulation of claim 1 wherein said R and R' are hydrogen, Q is methylene and R" is an alkylene group containing 1-6 carbons.

3. The formulation of claim 1 wherein said halogenated bisimide is N,N'-1,2-ethane-bis(5,6-dibromonorbornane-2,3-dicarboximide).

4. The formulation of claim 1 wherein said halogenated bisimide is N,N'-bis(5,6-dibromonorbornane-2,3-dicarboximide).

5. The formulation of claim 1 wherein said formulation additionally contains a synergistic amount of $Sb_2O_3$, $Bi_2O_3$, $MoO_3$, $ZrO_2$ or mixtures thereof.

6. The formulation of claim 1 wherein said formulation additionally contains a synergistic amount of $Sb_2O_3$.

7. The formulation of claim 1 wherein said formulation additionally contains $Sb_2O_3$ in an amount within the range of from about 2 wt. % to about 6 wt. %.

8. A molded or extruded article formed from the formulation of claim 1.

9. A molded or extruded article formed from the formulation of claim 5.

* * * * *